Patented Feb. 5, 1952

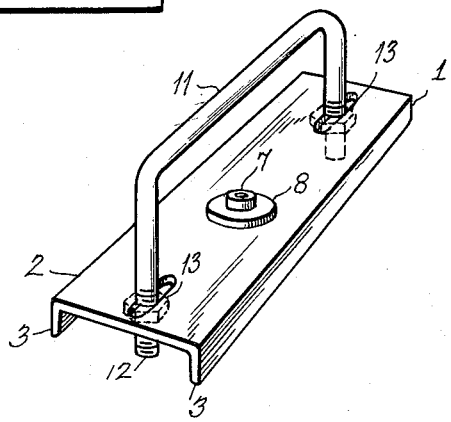
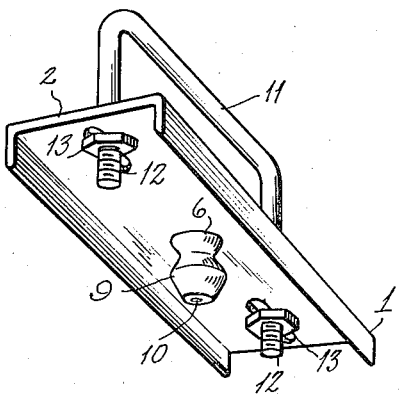
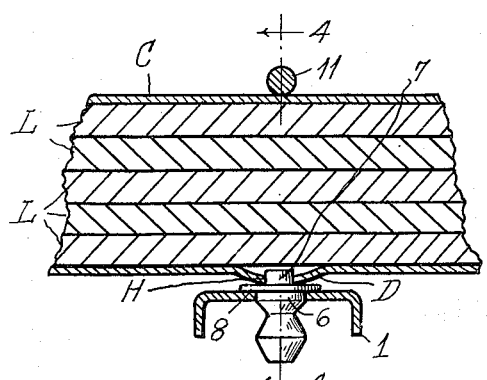
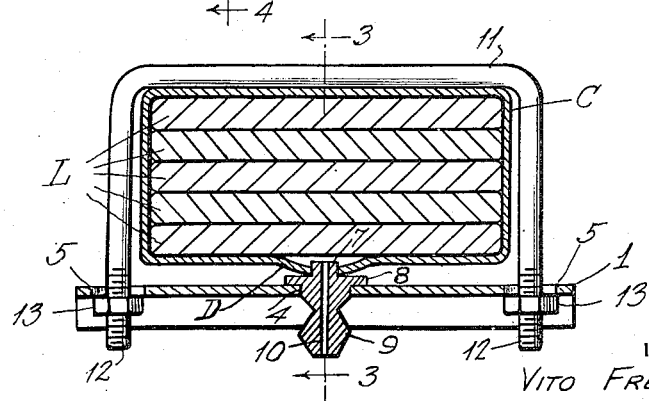

2,584,119

UNITED STATES PATENT OFFICE 2,584,119

LUBRICATING FITTING FOR VEHICLE SPRINGS

Vito Fresolone, Jr., Union, N. J.

Application May 17, 1950, Serial No. 162,555

2 Claims. (Cl. 184—1)

This invention is a fitting to facilitate the lubrication of vehicle springs.

Most present day automobiles have leaf springs which are provided with metal covers enclosing the leaves of said spring and adapted to be packed with grease, in order that said leaves will operate without friction or noise.

Each of these metal spring covers is usually provided with a grease admission hole with which a special C-clamp tool is adapted to be associated each time the spring is greased. This tool has a grease inlet with which is adapted to be engaged the nozzle of a grease gun so that grease may be forced through said tool into the cover for the purpose stated.

The object of the present invention is to provide a novel fitting adapted to be permanently associated with the lubrication opening of each spring cover, which fitting is provided with a headed male stud with which the female coupling of a conventional grease gun is adapted to be detachably engaged for the purpose of feeding grease into the cover without any possibility of the grease oozing out around the connection.

The device of this invention is adapted to be permanently secured against the lubrication opening of each spring cover to remain there throughout the life of the car and thus facilitate efficient and thorough greasing of the springs throughout that protracted period.

A further object of the invention is to provide a simple, economical and cheap fitting for the purpose stated and one which may be depended upon to retain its position on the cover and to be available at all times for the carrying out of its functions.

Speaking generally, the fitting of this invention comprises a rigid channel section provided centrally with a hole in which a stud is permanently secured. One end of the stud projects between the flanges of the section and constitutes a head or male connection with which the female nozzle of a grease gun is adapted to detachably engage. The other end of the stud projects through the hole in the channel section and is of a size to fit into the lubrication hole of a spring cover. A washer may be positioned around the latter portion of the stud to form a tight joint with the outer surface of the cover. The channel section, with the stud as described, is adapted to be mounted on a spring cover by means of a U-shaped yoke embracing the cover with the ends of the yoke passing through holes near the ends of the channel section and threaded to receive bolts for the purpose of binding the channel section firmly in place on the cover.

Features of the invention, other than those adverted to, will be apparent from the hereinafter detailed description and appended claims, when read in conjunction with the accompanying drawing.

The accompanying drawing illustrates one practical embodiment of the invention, but the construction therein shown is to be understood as illustrative, only, and not as defining the limits of the invention.

Figure 1 is a perspective view showing the fixture of this invention as viewed to show the top portion thereof.

Figure 2 is a like view but showing the bottom portion thereof.

Figure 3 is a longitudinal section of a spring and its cover with the fixture of this invention attached, the section being taken on the line 3—3 of Figure 4.

Figure 4 is a transverse section on the line 4—4 of Figure 3 with the yoke in elevation.

Referring to the drawings L designates the leaves of an automobile spring enclosed within a conventional spring cover C. The cover is provided in its bottom with a lubricating hole H, adjacent which the cover is outwardly domed as indicated at D.

The fixture of this invention comprises an elongated channel section 1 having a web 2 and flanges 3. This channel section is somewhat longer than the overall width of the spring and its cover, as shown in Figure 4, and it is of sufficient weight to be rigid and non-bendable, so that it will hold its shape during and after attachment to the spring. The center of the channel section is provided with a hole 4 and said section has elongated holes 5 near its opposite ends, said latter holes being beyond the lateral edges of the spring cover C.

Within the central hole 4 is rigidly affixed a stud 6. One end of this stud is in the form of a plug 7 adapted to extend through the hole H with a flange 8 at a base of the plug to bear against the outer surface of the domed portion D. If desired a soft washer may be interposed between these parts although this is not essential. The other end of the stud is in the form of a connection head 9, shaped to be received into the female connection nozzle of a grease gun. The stud has a central passage 10 through which grease may be passed from the grease gun into the interior of the cover.

The stud is secured in cooperative relation with the cover by means of an inverted U-shaped yoke 11 which extends across the top of the cover and downwardly along the sides therethrough, with its ends passing through the holes 5 in the ends of the channel section. The ends of said yoke are threaded as at 12 to receive nuts 13 which, when tightened, clamp the fixture firmly to the spring and its cover and hold the plug portion 7 of the stud firmly within the lubricating hole H of the cover. These nuts should be drawn up tightly and, with the channel section as shown, considerable pressure may be applied by the nuts to firmly hold the fixture in place without bending the channel section.

When each of the spring covers of a car are equipped with fixtures embodying the present invention, the lubrication of the springs becomes a simple and easy matter. The necessity of manually holding the grease gun in cooperative relation with the spring no longer prevails and adequate pressure may be applied to insure thorough packing of the spring cover with grease.

The device of this invention is simple, very economical to manufacture and it may be installed with ease and very quickly. It fills a long felt want and it makes it possible to properly grease springs quickly and without arduous labor.

In the foregoing description and in the drawing, the passage 10 through the stud through which the grease in introduced into the casing is shown as unencumbered. I may, however, provide this passage with a check valve which will permit grease to enter the spring cover but preclude its exit through the passage when the cover has been filled and the grease gun removed.

The foregoing detailed description sets forth the invention in its preferred practical form, but the invention is to be understood as fully commensurate with the appended claims.

Having thus fully described the invention what I claim as new and desire to secure by Letters Patent is:

1. A grease fitting for automobile springs enclosed in metal spring covers provided with a lubrication hole comprising: a channel section the web of which is provided with a central hole in which is mounted a stud having a grease passage therethrough, one end of the stud projecting beyond one face of the web to extend into the lubrication hole of the spring cover and the other end of the stud having a head to engage with a grease gun, and a U shaped yoke to extend over the spring and downwardly along the sides thereof and through holes in the ends of the web of the channel section, the ends of said yoke being threaded, and nuts screwed on to the yoke for clamping the spring cover and spring tightly between the channel section and the yoke to maintain the plug of the stud firmly seated in the lubrication hole of the cover.

2. A fixture as claimed in claim 1, wherein the end of the stud which engages with the grease gun is a male connector adapted for temporary interlocking relation with the nozzle of a grease gun.

VITO FRESOLONE, JR.

REFERENCES CITED

The following references are of record in the file of this patent:

UNITED STATES PATENTS

| Number | Name | Date |
|---|---|---|
| 1,635,413 | Hirst | July 12, 1927 |
| 2,003,709 | Eisenhauer | June 4, 1935 |
| 2,050,572 | Jones | Aug. 11, 1936 |

FOREIGN PATENTS

| Number | Country | Date |
|---|---|---|
| 152,243 | Great Britain | Oct. 14, 1920 |